Sept. 21, 1926. 1,600,288
P. B. McLELLAND
CLUTCH LEVER CONTROLLING DEVICE FOR AUTOMOBILES AND GAS ENGINES
Filed April 17, 1926 2 Sheets-Sheet 1

Presley B McLelland
INVENTOR.

BY

ATTORNEY.

Sept. 21, 1926.  
P. B. McLELLAND  
1,600,288  
CLUTCH LEVER CONTROLLING DEVICE FOR AUTOMOBILES AND GAS ENGINES  
Filed April 17, 1926  
2 Sheets-Sheet 2
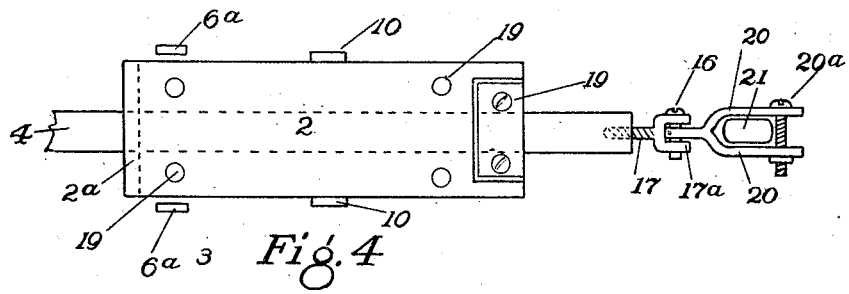
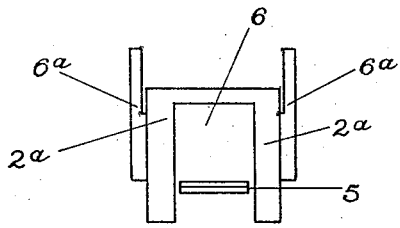
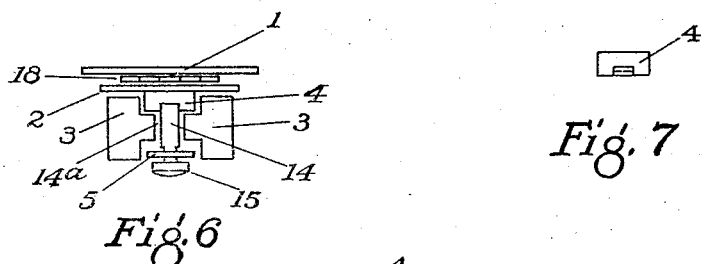
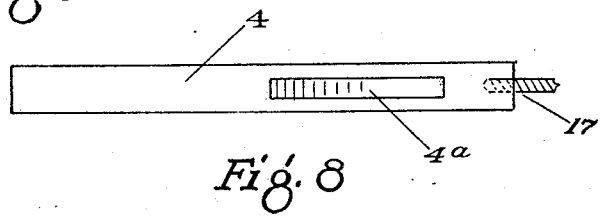
Presley B McLelland INVENTOR.
BY
ATTORNEY.

Patented Sept. 21, 1926.

1,600,288

UNITED STATES PATENT OFFICE.

PRESLEY B. McLELLAND, OF DAVENPORT, IOWA.

CLUTCH-LEVER-CONTROLLING DEVICE FOR AUTOMOBILES AND GAS ENGINES.

Application filed April 17, 1926. Serial No. 102,807.

My invention is intended particularly for motor vehicles employing planetary gear transmissions operated by foot pedals, but may be adapted to any form of transmission where a single lever is used to change through the low speed, neutral and high speed positions and will afford a convenient form of controlling device for the purpose of locking a pedal in a given position and affording simple, easy means of disengaging the lock.

My device is designed to provide means for locking the controlling mechanism in the neutral position so that the operator may remove his foot from the clutch pedal for the purpose of operating the reverse or brake levers and to furnish a measure of security against unintentionally throwing the clutch into low gear or unintentionally allowing it to be thrown into high gear by the usual controlling mechanisms in common use.

I attain these objects by the means illustrated in the accompanying drawings, in which—

Figure 1:
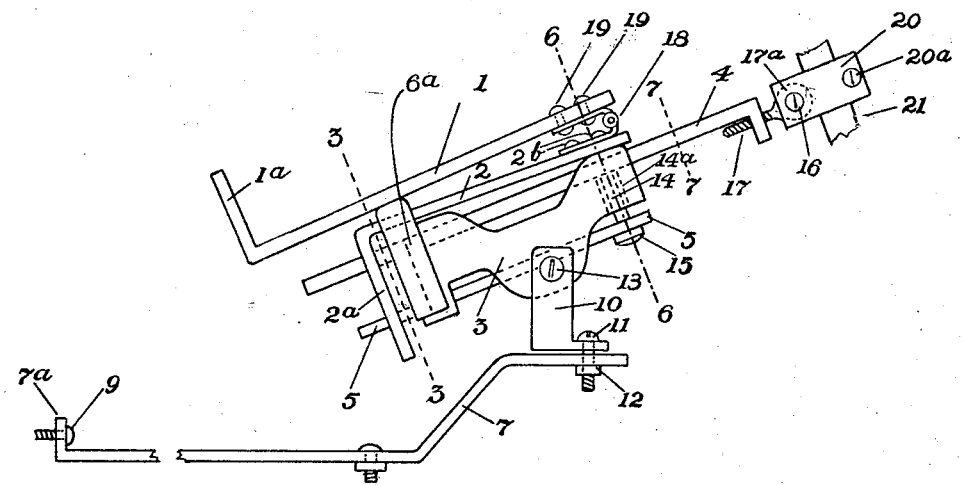
Figure 2:
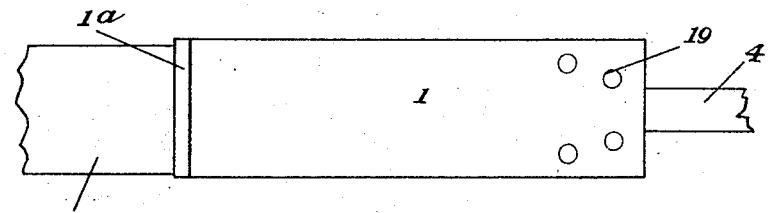
Figure 3:
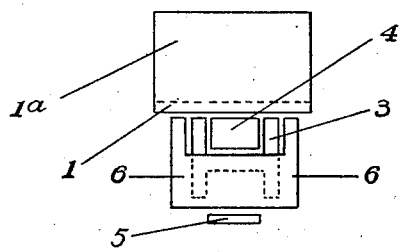

Figure 1 is a side elevation of my device showing it attached to the clutch pedal lever, 21; Fig. 2 is a top view but with the bar and base plate cut away; Fig. 3 is a cross-sectional view on the lines 3—3 of Figure 1; Fig. 4 is a top view of the device with the foot-plate, 1, removed; Fig. 5 is a detail rear view showing the bar lock, 6, in locked position; Fig. 6 is a cross section on the line, 6—6, of Figure 1; Fig. 7 is a cross section of the sliding bar, 4, on the line, 7—7, of Figure 1; Fig. 8 is a bottom view of the sliding bar, 4, and shows the channel, 4ᵃ.

My device comprises a base-plate, 7, which is a flat strip of sheet metal wide enough to afford a form of support for the remainder of the device and prevent tipping over sideways. For ordinary purposes, a width of two or three inches will be sufficient. The baseplate, 7, has its rear end, 7ᵃ, upturned at right angles and is designed to appear against the riser of the seat with the pin, 9, projecting into a hole bored in the riser so as to retain it in position. The lower portion of the base-plate, 7, is designed to rest upon an iron plate set in the floor board of the car and a pin, 8, is provided to enter a hole in the floor board and secure the device against lateral movement, and at the same time allow it to be readily and quickly removed whenever it is desired to remove the floor boards to fill the battery or for any other purpose, An intermediate portion of the base-plate, 7, extends upward and forward at a slope of approximately 45° and the front end thereof extends forwardly in a horizontal position. Upon the front end of the base-plate, 7, a yoke, 10, is pivotally mounted by the pivot or bolt, 11, secured in place by a nut, 12, and with a cotter key or lock nut if desired.

A pivot or bolt, 13, extends through the upwardly extending arms of the yoke, 10, and upon this pivot is mounted between arms, a substantially rectangular body, 3, which is preferably a casting and cut away to gain lightness as shown in the drawing. The body, 3, is provided with upper and lower longitudinal channels extending the entire length thereof. In the lower channel a spring, 5, is mounted with its middle portion resting upon the pivot, 13, to provide a fulcrum. The front end of the spring, 5, has secured thereto a pin, 14, which enters a circular opening, 14ᵃ, bored in the front end of the body, 3. This pin is preferably formed with a shoulder which rests upon the upper side of the spring, 5, and a nut, 15, upon the under side of the spring, 5, is screwed upon the lower end of the pin which is threaded to receive it, thus rigidly securing it to the spring 5.

The upper end of the pin, 14, is adapted to enter a channel, 4ᵃ, which is cut in the lower side of a sliding bar, 4, mounted in the upper channel of the body, 3. The channel, 4ᵃ, has its greatest depth near the front end of the bar, 4, and approximately the rear third of the channel slopes downwardly until it becomes flush with the lower face of the bar, 4. A plate, 2, is secured upon the upper face of the body, 3, and the rear end, 2ᵃ, of the plate 2, is bent downwardly at right angles as shown in Figure 1, but has its middle portion cut away to provide an opening through which the rear end of the sliding bar, 4, may extend when in certain positions.

A lock plate, 6, is mounted upon the spring, 5, at the rear end of the body, 3, and secured in place by the downwardly extending arms, 2ᵃ, of the cover plate, 2. The outer ends, 6ᵃ, of the lock plate, 6, are bent forwardly at right angles to the main portion thereof and form flanges which extend upwardly above the plate, 2, and engage a foot-plate, 1, which is secured to the cover plate, 2, by a hinge, 18, which may be fastened to to the cover plate and foot plate by rivets, 2ᵇ, and 19—19, respectively. The front end of the sliding bar, 4, is bent downwardly at right angles and a screw, 17, is secured in a threaded opening therein. The front end of the screw, 17, is formed into a yoke, 17ᵃ, adapted to receive one end of a clamp, 20, which in turn engages the foot pedal lever, 21, and is locked thereto by a bolt or screw, 20ᵃ.

Figure 1 shows the position of the parts when the pedal lever, 21, is at its extreme rear travel and the transmission in high gear. When in this position, the rear end of the bar, 4, extends rearwardly through the opening in the lock plate, 6, the lock plate, 6, being held in its downward position by the bar, 4. When the pedal lever, 21, is thrust forward by pressure of a foot upon the pedal, it draws the bar forward until the rear end of the bar clears the lock plate, 6. The lock plate, 6, is then forced upwardly by the spring, 5, and if the foot is removed from the pedal, the action of the spring which is always connected to the pedal lever, 21, in certain classes of automobiles as now constructed, will draw the pedal lever, 21, backwardly until the rear end of the bar, 4, strikes the lock plate, 6, which prevents further movement to the rear.

The clutch pedal lever, 21, will then be in neutral position. If desired to shift the transmission to low, it is then only necessary to depress the clutch pedal farther, throwing the clutch lever, 21, downward and forward and the pin, 14, will then ride upon the level face of the bar, 4.

The channel, 4ᵃ, in the bar, 4, is sloped so that the pressure of the pin, 14, upon the sloping surface of the channel will tend to prevent the pedal lever, 21, being shifted to low speed position accidentally, but will not furnish sufficient resistance to interfere with the efforts of the driver to shift the pedal lever, 21, and of course the tension of the spring now in common use in connection with such clutch levers will tend to hold it toward the rear and out of low speed position when freed from the pressure of the foot.

When the shift lever, 21, has been locked in neutral position as heretofore described, all that is necessary to release it and allow the usual spring secured to the clutch lever, 21, to throw it into high speed, is for the driver to depress the rear of the foot plate, 1. Pressing the rear of this foot plate downwardly will cause the foot plate to bear upon the flanges, 6ᵃ, of the lock plate, 6, and depress it to a point where the rear end of the bar, 4, can travel backwardly in the upper channel in the body, 3, and extend out past the end, 2ᵃ, of the plate, 2, as shown in Figure 1.

No other effort is necessary to throw this lever into high speed position, as the spring connections in common use on such automobiles automatically throw this lever into high speed position when pressure upon the pedal is removed.

It is obvious that when the clutch lever, 21, is locked in neutral, the driver may remove his left foot from the pedal and use it to operate the reverse lever or upon the brake as he may desire.

In the most common type of planetary gear automobiles now in use, the clutch lever is mounted upon a clutch lever shaft and has one end engaged by suitable linkage to a short lever extending downwardly from the lower end of the clutch pedal lever. The opposite end of the clutch lever is fitted with a clutch lever screw with locknut thereon adapted to be engaged by a speed lever mounted upon a controller shaft which in turn is operated by a hand lever. When my device is mounted upon such an automobile, the clutch lever screw should be entirely removed.

In the operation of my device, the clutch pedal is thrown into neutral position by the driver by pressure of his foot in the usual way. If desired to allow it to remain in neutral, the foot may be taken off the clutch pedal or pressure thereon released and the lock plate, 6, will hold the rear end of the bar, 4, against travel to the rear, thus securing the pedal lever, 21, in neutral position. When desired to shift into low speed position, the driver merely presses his foot upon the pedal in the usual way to reach the low speed position, taking his foot off of the pedal to allow the clutch lever, 21, to be returned to neutral position. In order to allow the lever, 21, to be thrown into high speed position, it is then necessary for the driver to depress the rear end of the foot plate, 1, thus depressing the lock plate, 6, and allowing the bar, 4, to be driven to the rear by the ordinary spring pressure upon the shift lever, 21. The position of the bar in high speed will prevent the locking plate from coming into its locked position until the lever, 21, is again thrown forward and downward into neutral position. It is obvious that the driver may keep pressure applied to the rear of the foot plate, 1, so as to prevent the locking plate, 6, from locking the bar, 4, in neutral position.

When it is desired to remove the floor boards for any purpose, the pin, 16, can easily be removed from the yoke of the bar, 4, and the entire device can be then be lifted out readily and replaced with equal facility.

It is obvious that various changes in the size, proportions and forms of the various parts of my device may be made without departing from the principle of my invention and I claim broadly not only the specific form of my device shown in the drawings, but also all mechanical equivalents for the various parts thereof.

In case any of the parts wear so as to produce any undesirable amount of play, the adjusting screw, 17, can be turned in the threaded bar, 4, sufficiently to take up any existing slack or play.

I claim:

1. A gear shift control device for planetary-gear motor vehicles comprising a base plate having a raised portion carrying a pivot or bolt seated therein, a body fulcrumed upon the pivot or bolt and having upper and lower channels formed therein, a bar slidingly mounted in the upper channel having its front end secured to the gear shift lever, a cover plate secured upon the channeled body adapted to retain the sliding bar therein and having its rear end bent downwardly at right angles near the rear end of the body, a locking plate seated between the downwardly extending end of the cover plate and the rear end of the body and having upwardly extending flanges at each end thereof, the locking plate being adapted to lock the sliding bar against rearward motion beyond the rear end of the body, a spring mounted in the lower channel of the body and extending downwardly to the rear thereof beneath the locking plate, a foot plate hinged to the front end of the cover plate with its rear end adapted to rest upon the flanges of the locking plate and to actuate same, an inclined channel formed in the underside of the sliding bar, a pin slidingly mounted in the front end of the body adapted to be engaged by the front end of the spring and to bear against the sliding bar.

2. A gear shift control device for planetary-gear engines, comprising a base plate having a raised portion carrying a pivot or bolt seated therein, a body fulcrumed upon the pivot or bolt and having upper and lower channels formed therein, a bar slidingly mounted in the upper channel having its front end secured to the gear shift lever, a cover plate secured upon the channeled body adapted to retain the sliding bar therein and having its rear end bent downwardly at right angles near the rear end of the body, a locking plate seated between the downwardly extending end of the cover plate and the rear end of the body and having upwardly extending flanges at each end thereof, the locking plate being adapted to lock the sliding bar against rearward motion beyond the rear end of the body, a spring mounted in the lower channel of the body and extending downwardly to the rear thereof beneath the locking plate, a foot plate hinged to the front end of the cover plate with its rear end adapted to rest upon the flanges of the locking plate and to actuate same, an inclined channel formed in the underside of the sliding bar, a pin slidingly mounted in the front end of the body adapted to be engaged by the front end of the spring and to bear against the sliding bar.

3. A gear shift control device for planetary-gear motor vehicles, comprising a base plate having a raised portion carrying a pivot or bolt seated therein, a body fulcrumed upon the pivot or bolt and having upper and lower channels formed therein, a bar slidingly mounted in the upper channel having its front end adjustably secured to the gear shift lever, a cover plate secured upon the channeled body adapted to retain the sliding bar therein and having its rear end bent downwardly at right angles near the rear end of the body, a locking plate seated between the downwardly extending end of the cover plate and the rear end of the body and having upwardly extending flanges at each end thereof, the locking plate being adapted to lock the sliding bar against rearward motion beyond the rear end of the body, a spring mounted in the lower channel of the body and extending downwardly to the rear thereof beneath the locking plate, a foot plate hinged to the front end of the cover plate with its rear end adapted to rest upon the flanges of the locking plate and to actuate same, an inclined channel formed in the underside of the sliding bar, a pin slidingly mounted in the front end of the body adapted to be engaged by the front end of the spring and to bear against the sliding bar.

4. A gear shift control device for planetary-gear motor vehicles comprising a base plate having a raised portion carrying a pivot or bolt seated therein, a body fulcrumed upon the pivot or bolt and having upper and lower channels formed therein, a bar slidingly mounted in the upper channel having its front end secured to the gear shift lever, a cover plate secured upon the channeled body adapted to retain the sliding bar therein and having its rear end bent downwardly at right angles near the rear end of the body, a locking plate seated between the downwardly extending end of the cover plate and the rear end of the body and having upwardly extending flanges at each end thereof, the locking plate being adapted to lock the sliding bar against rearward motion beyond the rear end of the body, a spring mounted in the lower channel of the body and extending downwardly to the rear thereof beneath the locking plate, a foot plate hinged to the front end of the cover plate with its rear end adapted to rest upon the flanges of the locking plate and to actuate same, an inclined channel formed in the underside of the sliding bar, a pin slidingly mounted in the front end of the body adapted to be engaged by the front end of the spring and to bear against the channeled portion of the sliding bar.

5. A controlling device for the gear shift lever of a planetary-gear motor vehicle comprising a channeled body pivotally mounted upon a suitable support, a sliding bar mounted in the channeled body and pivotally connected to the gear shift lever, and a movable stop plate secured at the rear of the channeled body adapted to lock the sliding bar against rearward movement when in neutral position.

6. A controlling device for the gear shift lever of a planetary-gear motor vehicle comprising a channeled body pivotally mounted upon a suitable support, a sliding bar mounted in the channeled body and pivotally connected to the gear shift lever, and a stop plate mounted at the rear of the channeled body adapted to automatically lock the sliding bar against rearward movement when in neutral position.

7. A controlling device for the gear shift lever of a planetary-gear motor vehicle comprising a channeled body pivotally mounted upon a suitable support to the rear of the gear shift lever, a sliding bar mounted in the channeled body and pivotally and adjustably connected to the gear shift lever, means for locking the sliding bar against rearward movement when in neutral position, and means operable by the foot of the driver for releasing the locking means from engagement with the sliding bar, without removing such foot from contact with the clutch pedal.

8. A controlling device for the gear shift lever of a planetary-gear motor vehicle comprising a channeled body pivotally mounted upon a suitable support to the rear of the gear shift lever, a sliding bar mounted in the channeled body and pivotally connected to the gear shift lever, means for locking the sliding bar against rearward movement when in neutral position, and means operable by the foot of the driver to prevent the locking means from automatically locking the sliding bar when in neutral position, without removing such foot from contact with the clutch pedal.

In testimony whereof he affixes his signature.

PRESLEY B. McLELLAND.